(12) United States Patent
Park et al.

(10) Patent No.: US 6,671,956 B2
(45) Date of Patent: Jan. 6, 2004

(54) METHOD OF PRODUCING METAL SUBSTRATES USED IN PURIFICATION OF EXHAUST GAS

(75) Inventors: Won-Wook Park, Changwon-shi (KR); Byoung-Gi Moon, Changwon-shi (KR); Ha-Sik Kim, Masan-shi (KR)

(73) Assignee: Korea Institute of Machinery and Materials (KR)

(*) Notice: Subject to any disclaimer, the term of this patent is extended or adjusted under 35 U.S.C. 154(b) by 176 days.

(21) Appl. No.: 09/881,568

(22) Filed: Jun. 13, 2001

(65) Prior Publication Data

US 2002/0066771 A1 Jun. 6, 2002

(30) Foreign Application Priority Data

Jun. 13, 2000 (KR) ........................................ 2000/32329

(51) Int. Cl.[7] ................................................ B23P 15/00
(52) U.S. Cl. .......................................... 29/890; 29/819
(58) Field of Search ........................ 29/890, 819, 33 R, 29/33 D, 726, 727, 417, 429; 422/177, 180; 502/527.19; 428/116

(56) References Cited

U.S. PATENT DOCUMENTS

| | | | | |
|---|---|---|---|---|
| 4,477,147 A | * | 10/1984 | Winter et al. | 385/111 |
| 4,567,630 A | * | 2/1986 | Ishida et al. | 29/6.2 |
| 4,711,009 A | * | 12/1987 | Cornelison et al. | 29/890 |
| 4,719,680 A | * | 1/1988 | Cyron | 29/890 |
| 4,726,105 A | * | 2/1988 | Yamanaka et al. | 419/3 |
| 4,824,011 A | * | 4/1989 | Maus et al. | 228/173.7 |
| 5,316,997 A | | 5/1994 | Toyoda et al. | |
| 5,366,700 A | | 11/1994 | Humpolik et al. | |
| 5,402,928 A | * | 4/1995 | Preston et al. | 228/181 |
| 5,409,759 A | | 4/1995 | Kondo et al. | |
| 5,516,383 A | * | 5/1996 | Jha et al. | 148/531 |
| 5,618,498 A | * | 4/1997 | Konya et al. | 422/174 |
| 5,718,027 A | * | 2/1998 | Laumann | 29/33 D |
| 5,881,442 A | * | 3/1999 | Hultberg et al. | 29/33 D |
| 6,405,919 B2 | * | 6/2002 | Frohne et al. | 228/173.7 |

FOREIGN PATENT DOCUMENTS

| | | |
|---|---|---|
| EP | 526 984 | 3/1999 |
| JP | 61-203-052 | 9/1986 |
| JP | 04-122418 | 4/1992 |
| JP | 04-371234 | 12/1992 |
| JP | 05-220404 | 8/1993 |
| JP | 06-000390 | 1/1994 |
| JP | 06-000391 | 1/1994 |
| JP | 06-047284 | 2/1994 |
| JP | 06-182222 | 7/1994 |
| JP | 06-238174 | 8/1994 |
| JP | 06-269683 | 9/1994 |
| JP | 06-277527 | 10/1994 |
| JP | 08-206512 | 8/1996 |
| JP | 8-225-239 | 9/1996 |

\* cited by examiner

*Primary Examiner*—I Cuda-Rosenbaum
(74) *Attorney, Agent, or Firm*—Meyertons, Hood, Kivlin, Kowert & Goetzel, P.C.; Eric B. Meyertons

(57) ABSTRACT

The present invention relates to an apparatus for mass production of metal substrates used in catalytic purification of exhaust gas, which includes: (a) an uncoiler part for continuously feeding a strip in the lengthwise direction, wherein said strip is coiled along a rotation axis; (b) a tubing processing part for changing the strip into the shape of a pipe by means of gradually putting pressure through multi-stage rolls onto both side edges of the strip in feed from said uncoiler part; (c) a feeder part, which is installed at one side of said tubing processing part, for feeding a pre-made honeycomb body at an equal interval to the strip being changed into the shape of a pipe; (d) a welding part, which is installed at the rear end of said tubing processing part, for welding into a unit both side edges of the strip in feed after being changed into the shape of a pipe; (e) a sizing part, which is installed at the rear end of said welding part, for evening the girth of the pipe in feed; and (f) a cutting part for cutting the pipe in feed from said sizing part into equal intervals.

6 Claims, 4 Drawing Sheets

METHOD OF PRODUCING METAL SUBSTRATES USED IN PURIFICATION OF EXHAUST GAS

BACKGROUND OF THE INVENTION

1. Field of the Invention

The present invention, which is used in catalytic purification of exhaust gas of an internal combustion engine, relates to an apparatus for mass production of metal substrates and a method of producing metal substrates by continuously inserting pre-made honeycomb bodies into metal outer shells.

2. Description of the Related Art

A "honeycomb body" refers to a thin metal sheet rolled into the shape of a honeycomb, and an "outer shell" refers to a metal pipe in which a honeycomb body is inserted. A "metal substrate" refers to a product in which said honeycomb body has been inserted into the outer shell.

Methods of inserting a honeycomb body into a metal outer shell may be classified into two main types. First is a method of inserting a honeycomb body into a prejoined outer shell in the shape of a pipe as described in Japanese Patent Nos. 5-228376, 6-390, 6-391, 6-47284, 6-63421, 6-182222, 6-238174, 7-24330, 8-206512; and U.S. Pat. No. 5,366,700. Second is a method of inserting a honeycomb body into a nonjoined outer shell in the shape of a "C" or into an outer shell of several pieces cut lengthwise, followed later by joining of the outer shell as described in Japanese Patent Nos. 4-122418, 5-220404, 6-269683, 6-277527; and U.S. Pat. No. 5,316,997.

These methods are appropriate for small-lot production of products of various shapes and sizes. However, while mass production of a single product is characteristic of manufacturing industries such as automobiles and motorcycles, these methods are not appropriate for mass production of metal substrates. In particular, when making an outer shell, the process of cutting the sheet into several pieces and changing the same into the shape of a pipe includes no structural part to secure them in a precise position, which in turn leads to a slight movement therein. Consequently, while in the shape of a pipe, the welding machine for welding both side edges into a unit may not precisely align with the welding area, which in turn becomes a cause of defective products.

Further, an additional sizing process is necessary to shape the pipe into a complete cylinder after welding by evening the girth of the pipe, or to shape it into a track shape, if needed, by compress-molding the cylindrical pipe into the track shape. Sizing, as such, is carried out while supporting the pipe cut into a piece, but at the time of sizing, the pipe can move slightly, which leads to a problem of imprecise sizing.

SUMMARY OF THE INVENTION

An embodiment herein describes an apparatus for mass production of metal substrates used in purification of exhaust gas, and the method of producing metal substrates using the same, which renders transformed pipes immovable for accurate welding at the welding area in addition to efficiently carrying out the sizing operation.

Another embodiment includes an apparatus for mass production of metal substrates used in purification of exhaust gas, and the method of producing metal substrates using the same, which integrates the following processes into one process for simplifying the multi-step manufacturing process of the prior art: tubing process of an outer shell into the shape of a pipe, inserting process of a honeycomb, and welding process of an outer shell.

BRIEF DESCRIPTION OF THE DRAWINGS

Other objects and advantages of the invention will become apparent upon reading the following detailed description and upon reference to the accompanying drawings in which.

Figure 1:
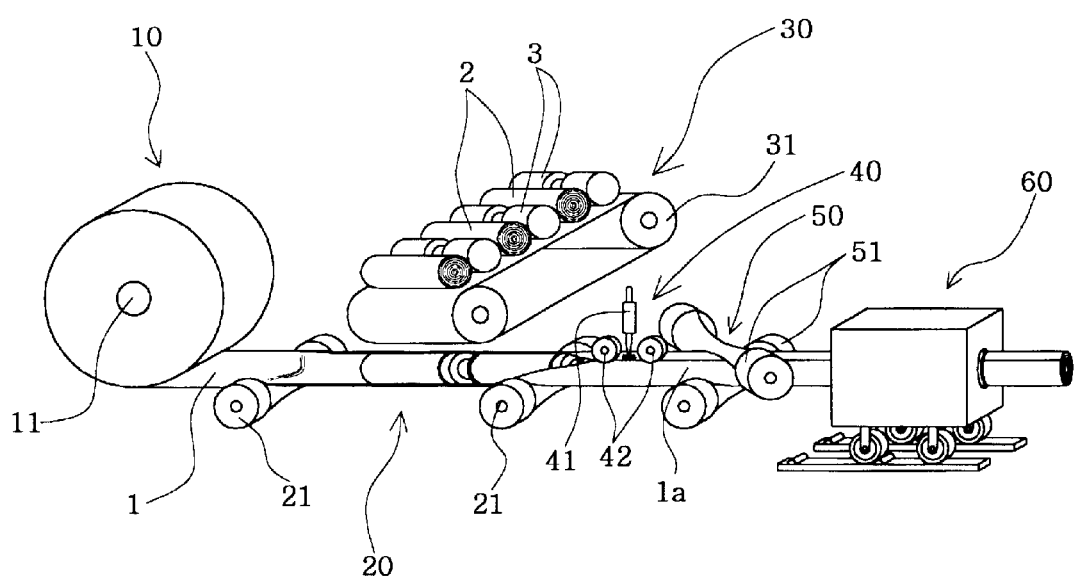
FIG. 1 depicts an apparatus for mass production of metal substrates.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF THE PREFERRED EMBODIMENT

The apparatus for mass production of metal substrates used in purification of exhaust gas, according to the embodiments described herein, includes: (a) an uncoiler part for continuously feeding a strip in the lengthwise direction, wherein said strip is coiled along the rotation axis; (b) a tubing processing part for changing the strip into the shape of a pipe by means of gradually putting pressure through multi-stage rolls onto both side edges of the strip in feed from said uncoiler part; (c) a feeder part, which is installed at one side of said tubing processing part, for feeding a pre-made honeycomb body at an equal interval to the strip being changed into the shape of a pipe; (d) a welding part, which is installed at the rear end of said tubing processing part, for welding into a unit both side edges of the strip in feed after being changed into the shape of a pipe; (e) a sizing part, which is installed at the rear end of said welding part, for evening the girth of the pipe in feed; and (f) a cutting part for cutting the pipe in feed from said sizing part into equal intervals.

As shown in FIG. 1, an embodiment described herein includes: (a) an uncoiler part 10 for continuously feeding a strip 1 in the lengthwise direction, wherein said strip is coiled along the rotation axis 11; (b) a tubing processing part 20 for changing the strip into the shape of a pipe by means of gradually putting pressure through multi-stage rolls 21 onto both side edges of the strip 1 in feed from said uncoiler part 10; (c) a feeder part 30, which is installed at one side of said tubing processing part 20, for feeding a pre-made honeycomb body 2 at an equal interval to the strip 1 being changed into the shape of a pipe; (d) a welding part 40, which is installed at the rear end of said tubing processing part 20, for welding into a unit both side edges of the strip 1 in feed after being changed into the shape of a pipe; (e) a sizing part 50, which is installed at the rear end of said welding part 40, for evening the girth of the pipe 1a in feed; and (f) a cutting part 60 for cutting the pipe 1a in feed from said sizing part 50 into equal intervals. Strip 1 refers to a strip while in feed from the uncoiler part 10 prior to its welding, and pipe la refers to a welded strip after being changed into the shape of a cylinder.

Prior art involves first cutting strip 1 into several pieces to form them respectively into the shape of a pipe, followed by welding and sizing. Unlike the prior art, however, the apparatus described herein is structured in such a way to continuously feed strip 1 in the lengthwise direction, while being supported, followed later by cutting. As such, there is no movement whatsoever on the part of strip 1. Consequently, the present invention leads to quality improvement due to its precision operations in terms of molding, welding, and sizing of the strip.

Furthermore, the apparatus enables mass production of metal substrates by operating an integrated automatic system of the following processes: tubing process of an outer shell into the shape of a pipe, inserting process of a honeycomb, welding process of an outer shell, and cutting process of a pipe.

The method of producing metal substrates by means of an apparatus according to the embodiment described above includes the following steps: (a) forming metal strip 1 to change it into the shape of a pipe in the lengthwise direction by putting pressure on both side edges thereof while in. feed; (b) inserting honeycomb body 2 into said strip 1 at an equal interval, wherein said honeycomb body 2 is pre-made during the step of forming strip 1 into the shape of a pipe; (c) welding both side edges of the pipe inserted with said honeycomb body 2; (d) sizing the pipe by evening said welded pipe; and (e) cutting pipe 1a at a desired interval after undergoing said step of sizing.

Figure 4:
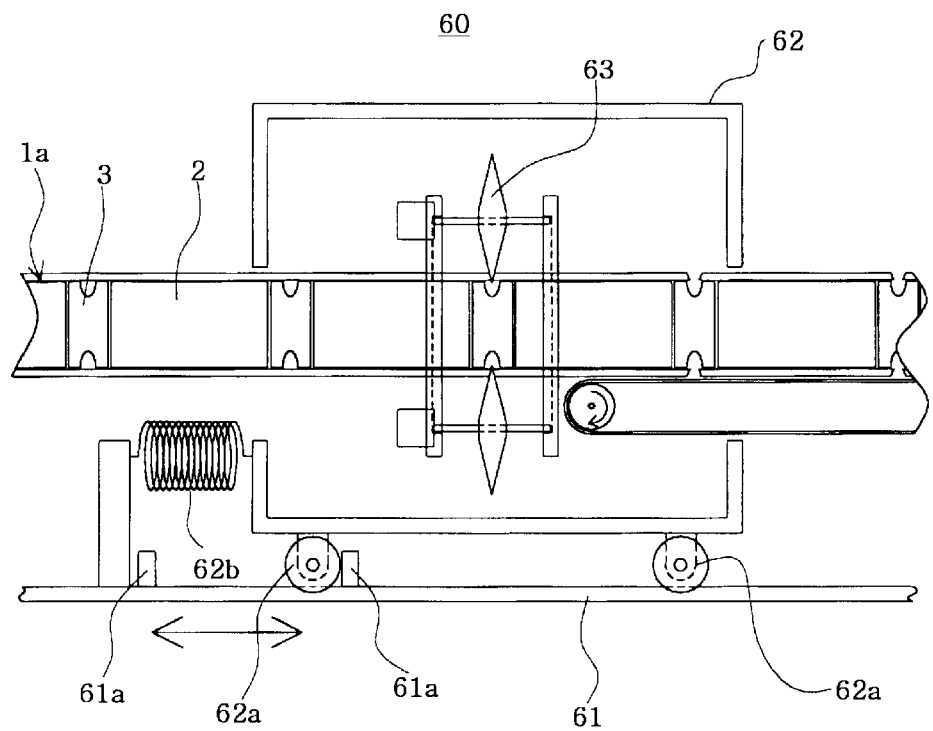
FIG. 4 depicts a cross-sectional front view of the cutting part of the apparatus of FIG. 1.

When inserting a honeycomb body, it is preferable to insert dummy bar 3, which is concave at the center, between honeycomb bodies 2. It is preferable to have a dummy bar that is concave at the center in the shape of a spool. This type of design results in reusability since the dummy bar, as shown in FIG. 4, does not become damaged at the cutting area on pipe 1a when the pipe is cut.

Uncoiler part 10, as shown in FIG. 1, is a structural part which continuously feeds strip 1 in the lengthwise direction, wherein said strip is coiled at rotation axis 11. The structure is in place to support the cut metal strip 1 and continuously feed the same thereto according to the diameter of the outer shell. By continuously feeding strip 1 in the direction of progression while being supported at multi-stage rolls 21, strip 1 is thus rendered immovable.

Tubing processing part 20, as shown in FIG. 1, has a number of multi-stage rolls 21 in place, each of which has a smaller sectional area towards its concave center. Tubing processing part 20 carries out the role of changing the strip into the shape of a pipe by gradually putting pressure onto both side edges of strip 1 in feed from uncoiler part 10. At the center, one side of tubing processing part 20 is connected to feeder part 30 so that honeycomb body 2 can be inserted therein before the width of the upper portion of the part to be welded on the C-shaped strip 1 becomes lesser than the outer diameter of honeycomb 2.

Figure 2:
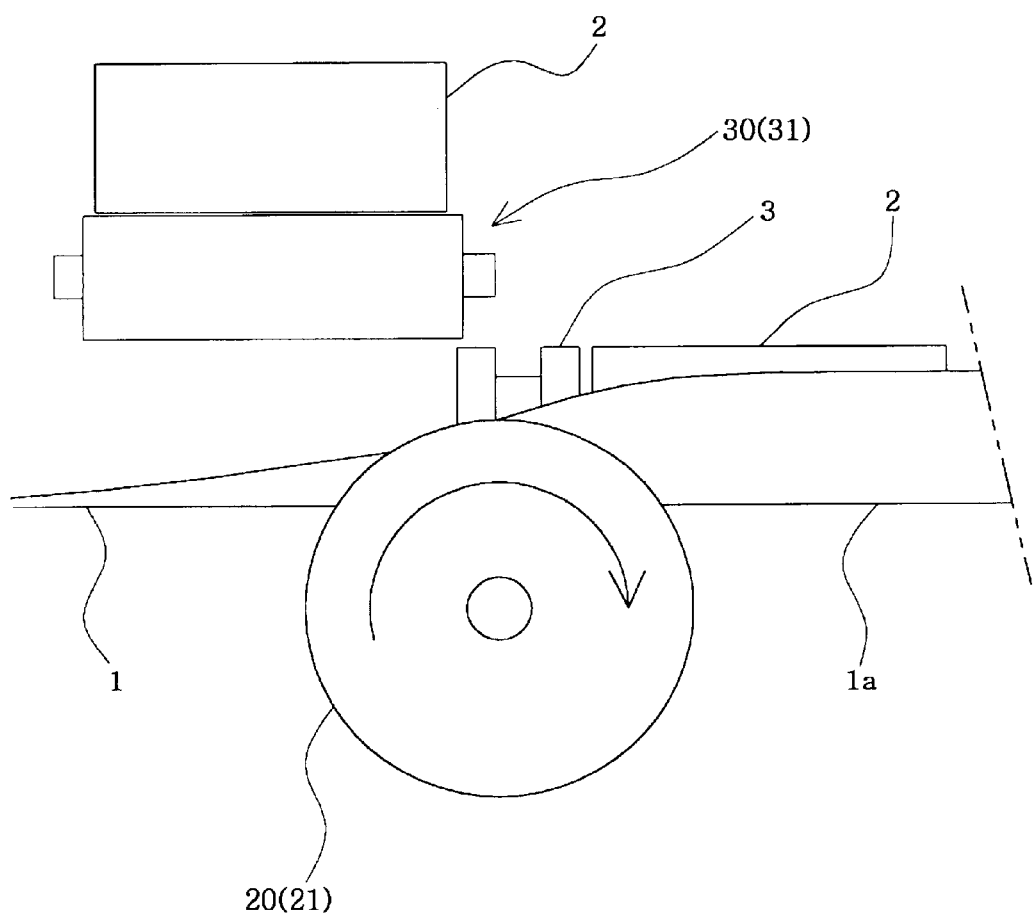
FIG. 2 depicts a front view of the tubing processing and feeder parts of the apparatus of FIG. 1.
Figure 3:
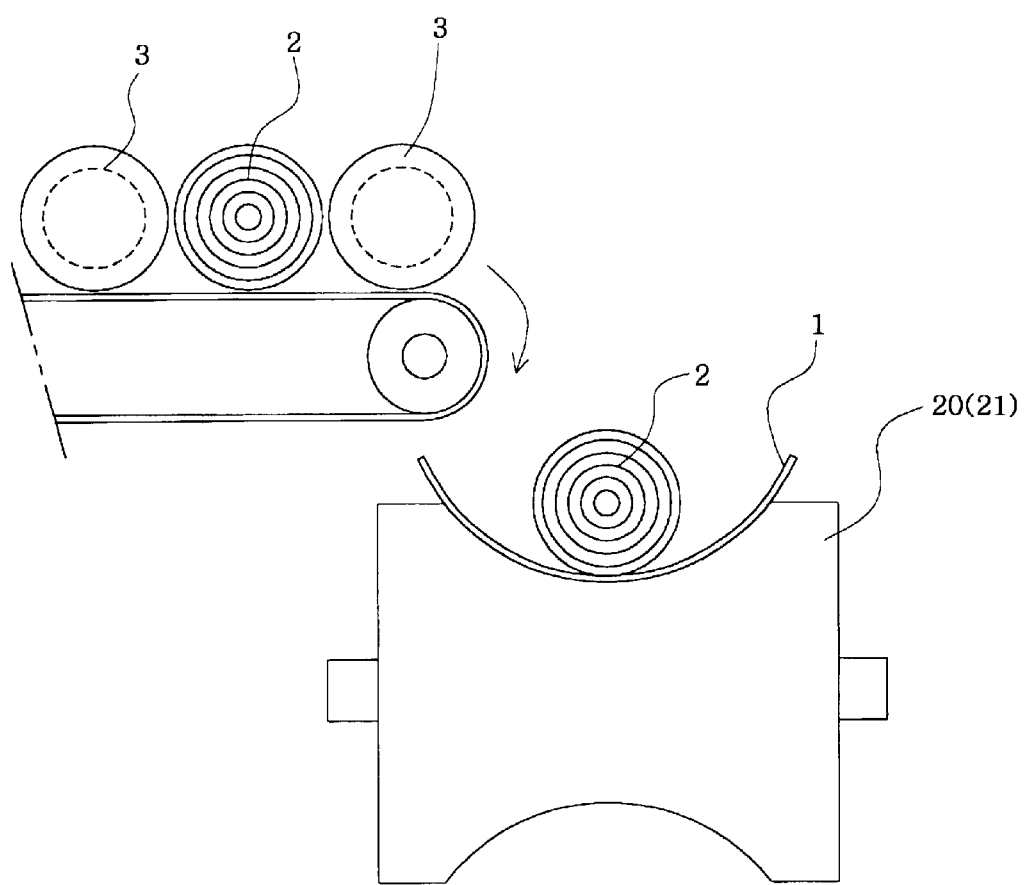
FIG. 3 depicts a cross-sectional side view of the tubing processing and feeder parts of the apparatus of FIG. 1.

Feeder part 30, as illustrated in FIG. 1 through FIG. 3, is a structural part, installed at one side of tubing processing part 20, which feeds pre-made honeycomb 2 to strip 1 at an equal interval while said strip 1 is being changed into the shape of a pipe. Feeder part 30, which is situated above the upper portion of tubing processing part 20 or the area to be welded, carries out the role of feeding pre-made honeycomb 2 at a pace in line with the speed of progression of strip 1 during the tubing process by using such a means of feed as conveyor belt 31. As described above, it is preferable to feed a dummy bar 3 between the honeycomb bodies 2 in order to maintain a certain interval in between.

Welding part 40, as shown in FIG. 1, is a structural part, installed at the rear end of tubing processing part 20, for welding strip 1 into a unit with welding implement 41 by joining both side edges of strip 1. Holders 42 are for leveling the welding area, wherein said strip is in feed after being changed into the shape of a pipe. Welding part 40 is designed in such a way to allow continuous welding of the joined areas on the pipes as the area to be welded on the strip is moved forward from tubing processing part 20 after the completion of forming it into the shape of a cylinder via multi-stage rolls 21. Welding implement 41, such as an ordinary oxygen-gas, TIG, MIG, or laser welding machine, may be used. Immovable strip 1, as supported, is fed to welding area 40, thereby allowing accurate welding on pipe 1a.

Sizing part 50, as shown in FIG. 1, installed at the rear end of welding part 40, is a structural part for evening the girth of pipe 1a with sizing rolls 51. It is used to make the shape of a pipe completely cylindrical after being welded completely in welding part 40. In sizing part 50 as well, immovable strip 1, as supported, is fed thereto, and thereby the sizing of pipe 1a may be carried out with precision.

Figure 5:
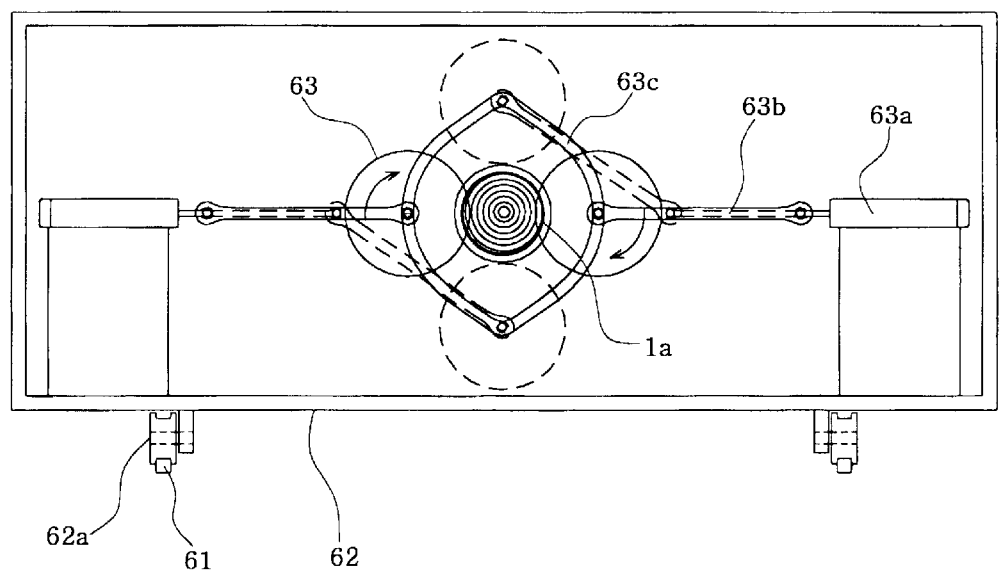
FIG. 5 depicts a cross-sectional side view of the cutting part of the apparatus of FIG.

Cutting part 60, as shown in FIGS. 4 and 5, is a structural part for cutting pipe 1a in feed from sizing part 50 at equivalent intervals. Cutting part 60 includes: (a) rails 61 for allowing movement, having a pair of stoppers 61a for respectively limiting the traveling distance thereof back and forth, wherein said rails are installed side by side at the lower part of said cutting part 60 along the direction of the pipe in feed; (b) frame body 62 in the shape of a box, which allows passage of said pipe 1a through the interior thereof, the lower part of which has wheels for moving back and forth to the extent of stoppers 61a along rails 61; and (c) cutting wheels 63, which are supported within said frame body 62, for cutting the pipe passing through the interior of the frame body.

Frame body 62, as shown in FIG. 4, moves forward by force of progression of pipe 1a and returns to its original position by means of return spring 62b. The force of return spring 62b should be less than the force on frame body 62 when moving forward.

Further, as shown in FIG. 5, cutting wheels 63, which are made 180° rotatable, are installed as a pair, facing each other, on both sides within frame body 62. Cutting wheels 63 are supported by wheel-support piece 63c, which in turn is connected to support rack 63a by crank 63b.

Cutting part 60 cuts the pipe according to the set length, at the position of dummy bar 3 as inserted between honeycomb bodies 2. In particular, for the purpose of reusing the dummy bars, cutting wheels 63, as they revolve around the girth of pipe 1a, cut only the outer pipe. For the purpose of continuously feeding the strip, cutting part 60 is designed to move back and forth on rails 61 for allowing movement between stoppers 61a. As the pipe is advanced forward, the cutting is effectively carried out therein. Moreover, for the purpose of cutting at an accurate length, a controller, which can control the timing and the length, can be installed thereto.

In the case of using a pipe, cut lengthwise, with a cross-section in the shape of a "C" by way of undergoing a primary tubing process, uncoiler part 10 and tubing processing part 20 can be omitted therein. In such a case, a tightening part is needed to tighten the area to be welded on the pipe in addition to a feeder part, which is designed to insert a number of honeycomb bodies therein.

As described above, the apparatus for mass production of metal substrates and the method of producing metal substrates using the same results in accurate welding and sizing operations, due to the strip not breaking away from a precisely set position, by continuously feeding the coiled strip while supporting it through multi-stage rolls.

Further, the embodiment described herein has the effect of substantially reducing manufacturing time along with cutting unit cost since it enables mass production of products of certain specifications by way of its simple process as compared to that of the prior art.

Moreover, the embodiment of the apparatus described above allows insertion of a honeycomb body without damage to the outer shell. It also allows close contact between the honeycomb body and the outer shell, which in turn enhances durability and permeability of the product. Moreover, the embodiment has the effect of reducing installation cost of the apparatus since it uses a TIG or MIG welding machine, which is comparatively cheaper than a laser-welding machine.

Further modification and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing metal substrates used in purification of exhaust gas, comprising:

(a) altering a strip of metal to change it into the shape of a pipe in the lengthwise direction by putting pressure on both side edges of the strip of metal while uncoiling the strip of metal from an uncoiler part;

(b) inserting honeycomb bodies into said strip at substantially equal intervals;

(c) welding both side edges of the pipe inserted with said honeycomb bodies;

(d) evening said welded pipe; and (e) cutting the pipe at a desirable interval.

2. The method of claim 1, wherein said step of inserting honeycomb bodies comprises inserting a dummy bar, which is concave at the center, between the honeycomb bodies.

3. The method according to claim 2, wherein said dummy bar is in the shape of a spool.

4. The method according to claim 2, wherein said dummy bar is reusable.

5. The method according to claim 2, wherein cutting the pipe comprises cutting the pipe with a cutting part, the cutting part comprising cutting wheels, and wherein said cutting wheels cut the pipe at the dummy bar.

6. The method according to claim 1, wherein cutting the pipe comprises cutting the pipe with a cutting part, the cutting part comprising cutting wheels, wherein said cutting wheels revolve around and cut the girth of the pipe.

* * * * *

UNITED STATES PATENT AND TRADEMARK OFFICE
CERTIFICATE OF CORRECTION

PATENT NO.   : 6,671,956 B2
DATED        : January 6, 2004
INVENTOR(S)  : Park et al.

It is certified that error appears in the above-identified patent and that said Letters Patent is hereby corrected as shown below:

<u>Title page,</u>
Item [*] Notice, delete "by 176 days" and insert -- by 150 days --.

Signed and Sealed this

Thirty-first Day of January, 2006

JON W. DUDAS
*Director of the United States Patent and Trademark Office*